United States Patent

Cornelius

[15] 3,642,174
[45] Feb. 15, 1972

[54] METHOD AND APPARATUS FOR DISPENSING A SEMIFROZEN COMESTIBLE

[72] Inventor: Richard T. Cornelius, Minneapolis, Minn.
[73] Assignee: The Cornelius Company, Anoka, Minn.
[22] Filed: Oct. 16, 1969
[21] Appl. No.: 866,861

[52] U.S. Cl. ..................222/129.1, 222/146 C, 62/306, 99/78
[51] Int. Cl. ..........................................B67d 5/56
[58] Field of Search ...............222/146, 129.1, 129.2, 129.3, 222/129.4, 166; 62/306 X, 69–70; 99/78, 79, 28, 136, 192

[56] References Cited

UNITED STATES PATENTS

| | | | |
|---|---|---|---|
| 3,044,878 | 7/1962 | Knedlik | 62/306 X |
| 3,403,524 | 10/1968 | Mitchell et al. | 62/306 X |
| 3,468,137 | 9/1969 | Welty | 62/306 X |
| 3,477,244 | 11/1969 | Scoggins | 99/136 |
| 3,505,075 | 4/1970 | Black | 99/136 X |
| 3,011,681 | 12/1961 | Kromer | 222/146 C X |
| 3,213,903 | 10/1965 | Armstrong | 222/146 C X |
| 3,460,713 | 8/1969 | Cornelius | 222/129.1 X |

Primary Examiner—Samuel F. Coleman
Assistant Examiner—Larry H. Martin
Attorney—Hill, Sherman, Meroni, Gross and Simpson

[57] ABSTRACT

A regulated flow of water is refrigerated, and a source of concentrated orange juice at atmospheric pressure is also refrigerated and is metered and combined with the water under pressure in a refrigerated blending and storage device along with nitrous oxide gas, and the resulting mixture is transferred to a separate freezing chamber where water is frozen from the mixture as pure ice. The mixture is dispensed from the freezing chamber to atmospheric pressure so that the nitrous oxide gas breaks out of the semifrozen product to render it fluffy.

6 Claims, 1 Drawing Figure

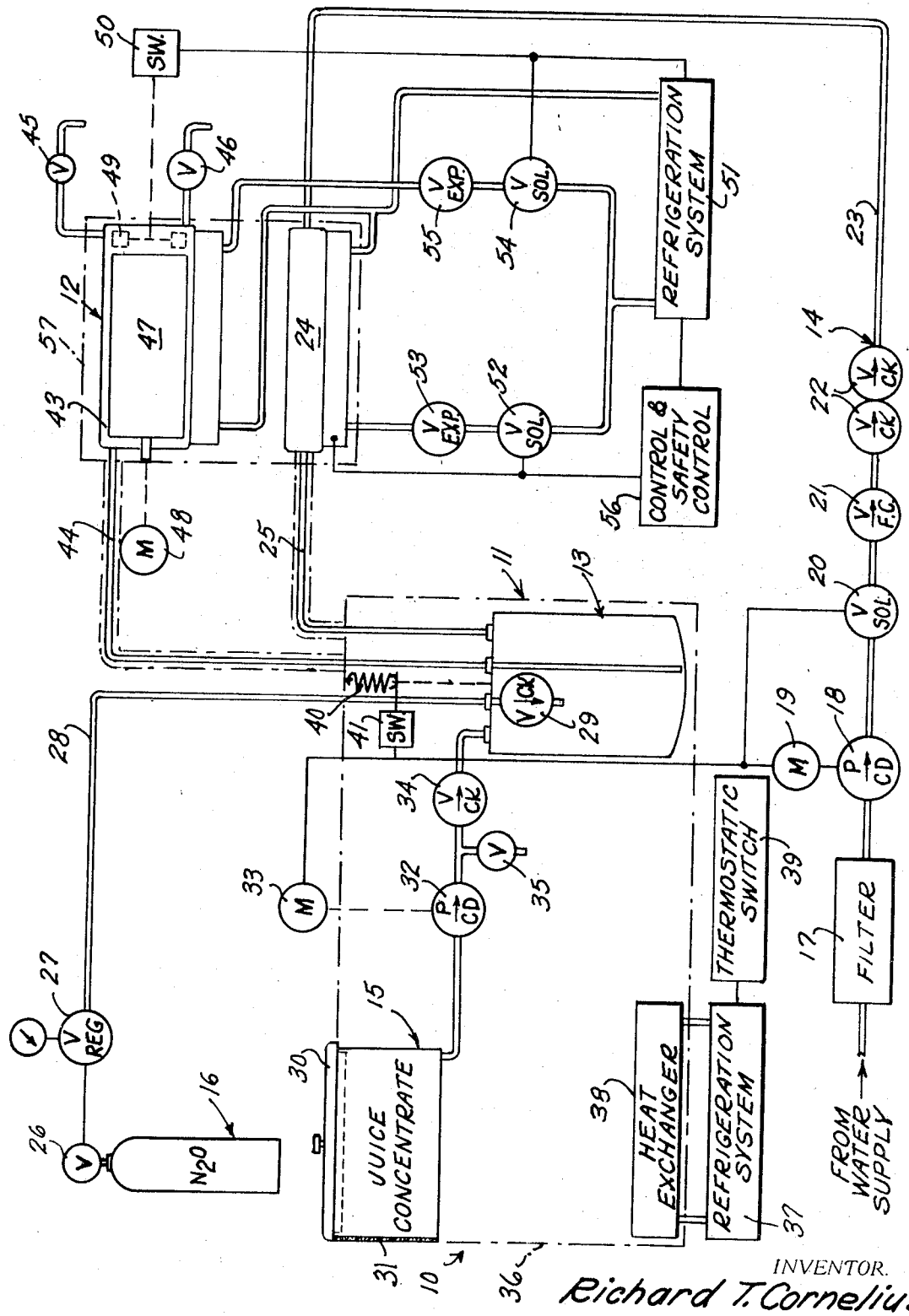
INVENTOR.
Richard T. Cornelius 3,642,174

METHOD AND APPARATUS FOR DISPENSING A SEMIFROZEN COMESTIBLE

BACKGROUND OF THE INVENTION

1. Field of the Invention

This invention relates to an apparatus for producing and dispensing a semifrozen comestible, made from an unfrozen concentrate of the comestible containing sugar, for example, concentrated natural fruit juice such as orange juice.

2. Prior Art

Heretofore, it has been known to add water to concentrated orange juice, to refrigerate the same and to dispense the same. It has also been known to refrigerate a beverage which is a flavored sugar solution until some ice forms therein and to dispense the same, all under atmospheric pressure. It has also been known to carry out the same process using a carbonated beverage under pressure, such as the well-known brands of cola beverage. From a commercialization standpoint, one difficulty with these last two methods is that they deal basically with a confection rather than with a nutritious food, thereby meeting commercial resistance from dietitians, school authorities and the like. If one were to merely freeze orange juice until it had some ice in it, the resulting product would lack the consumer appeal of a semifrozen carbonated beverage. On the other hand, if one were to substitute orange juice for cola syrup in a semifrozen carbonated beverage system, problems would arise since such systems do not employ refrigerated storage for the syrup and further the syrup is stored under pressure making it difficult or impossible for the operator to add additional concentrate without depressurization.

SUMMARY OF THE INVENTION

In this invention, a concentrated comestible such as orange juice is stored at atmospheric pressure under refrigeration and is thereafter reconstituted by the addition of water. Such reconstituting is done by admixing the desired proportion of ingredients in an atmosphere of food-grade gas such as nitrous oxide that is soluble in the liquid. The amount of concentrate used in such admixing is carefully metered and the amount of water used is governed by a flow-rate control valve whereby the admixing is carried out under pressure. The mixture is thereafter further refrigerated in a separate freezing chamber to form ice nitrous and on dispensing, the nitrous oxide breaks out of the semifrozen comestible and in doing so renders the semifrozen comestible fluffy, without having imparted any significant flavor thereto and without constituting any adulterant therein.

Accordingly, it is an object of the present invention to provide an apparatus for dispensing a semifrozen comestible made from an unfrozen concentrate of the comestible which is stored at atmospheric pressure.

A further object of the present invention is to provide an apparatus for processing and dispensing concentrated orange juice without having any adulterant in the resulting product.

A still further object of the present invention is to provide an apparatus for reconstituting a concentrated comestible in a semifrozen and fluffy form.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWING

The drawing is a diagrammatic view of a system for preparing and dispensing a semifrozen comestible embodying the present invention.

AS SHOWN ON THE DRAWING

The principles of the present invention are particularly useful when embodied in a juice-dispensing system such as shown in the drawing, generally indicated by the numeral 10. The system 10 includes a storage source 11 of the product to be partially frozen and a freezing and dispensing cylinder 12. The storage source 11 includes a blending and storage device 13 to which is connected a source of water 14 and a source of concentrated comestible or concentrated juice 15 and a source of food-grade gas 16 such as nitrous oxide.

The source of water 14 is connected to a conventional supply of water which is normally treated by a filter 17 and then delivered at a controlled pressure by a constant delivery pump 18 that is driven by a motor 19, the output of the pump 18 being under the further control of a solenoid valve 20, and an adjustable flow-rate control valve 21. A double-check valve 22, 22 leads from the flow control valve through a line 23 to a refrigerated precool plate 24 and through an insulated line 25 to the inlet of the blending and storage device 13.

The source of gas 16 comprises a conventional cylinder that has a shutoff valve 26 which leads to an adjustable pressure regulator valve 27 and then through a line 28 and through a check valve 29 of the snifter valve type to discharge into the interior of the blending and storage device 13.

The source of concentrated comestible or juice concentrate 15 is a container that is disposed for ready access, the interior of which is at atmospheric pressure. It has an opening in the top thereof closed by a manually removable cover 30, and at one end it has a sight glass 31 or equivalent means enabling the operator to known the amount of concentrate contained therein. The source of concentrated comestible 15 is connected by a proportioning pump 32 of the metering type which is driven by a motor 33, the pump leading through a check valve 34 to another inlet of the blending and storage device 13. A sampling valve 35 is provided downstream of the pump 32 to enable it to be used for drawing off samples of concentrate for verifying the rate of delivery of the pump 32. It is also used in connection with priming such pump and may be used in connection with draining the source 15. The source of concentrated comestible 15 and the blending and storage device 13 are disposed within a refrigerated housing 36 to which is connected a refrigeration system 37 that includes a heat exchanger 38 in the chamber 36. The refrigeration system 37 is under the control of a thermostatic switch 39 which senses the temperature inside the chamber 36.

The blending and storage device 13 is vertically movable and is in part supported by a spring 40. When the amount of mixture in the blending and storage device 13 has reached a lower limit, the blending and storage device 13 rises sufficiently to actuate a switch 41 which is connected to turn on the concentrate pump motor 33, the water pump motor 19 and the water solenoid 20. When sufficient concentrate and water have entered the blending and storage device 13, the switch 41 terminates the filling operation.

The freezing cylinder 12 has an internal chamber 43 which is connected by an insulated line 44 to the outlet of the blending and storage device 13. A combined automatic relief valve and manual vent valve 45 is connected to the upper part of the chamber 43 to enable complete filling of the chamber 43. A somewhat larger dispensing valve 46 is connected to the lower part of the chamber 43. The valve 46 is of a known type which agitates the product as much as possible during dispensing. The product is agitated by a combined scraper and stirrer 47 driven by a continuously operating motor 48. The proportion of ice that has been frozen out of the mixture is determined by a pivotably supported drag-sensing element 49 that is connected to operate a switch 50. A second refrigeration system 51 has an outlet that is divided, one branch being under the control of a solenoid valve 52 and an expansion valve 53 while the other branch is under the control of a solenoid valve 54 and an expansion valve 55. The expansion valve 53 brings refrigerant to the precool plate 24 and the expansion valve 55 brings refrigeration to the freezing cylinder 12. The switch 50 is connected to control the solenoid valve 54 and the refrigeration system 51, while a control switch 56 is connected to sense the temperature of the precool plate 24 for controlling the solenoid valve 52 and the refrigeration system 51. The control 56 includes a secondary control as a safety to shut the system down in the event that freezing of water in the precool plate 24 becomes imminent. If desired, various other controls and interlocks can be provided as is known in the refrigeration and dispensing art. The chain line 57 denotes insulation for the freezing chamber 12 and the precool plate 24.

The control 56 is normally set so that water discharging from the precool plate 24 through the line 25 will have a temperature on the order of 34° F. The thermostatic switch 39 is set to about this same value so that the temperature in the chamber 36 should be between 33 and 35° F. An adjustment on the switch 50 (not shown, but conventional) is set so that when the product in the chamber 43 has about 60 percent ice, it will provide sufficient drag to enable the switch 50 to close the solenoid valve 54. Such a percentage of ice will be obtained when a temperature of about 25° F. is reached in the chamber 43.

The motor 48 has an output on the order of 125 r.p.m. which is the rotational speed of the combined scraper-stirrer 47. The example given as to percentage ice and temperature in the chamber 43 is based on the adjustable flow control valve's 21 being set to deliver a flow rate which is exactly four times that of the metered rate provided by the pump 32, and is further based on the use of a concentrate such as orange juice in the source 15 which has a Brix of 51.2, which therefore provides a Brix of about 12.8 in the line 44. This is a normal degree of sweetness for reconstituted orange juice. However, as ice is formed in the chamber 43, the sugar that was in solution with the portion becoming frozen separates therefrom so that pure ice is formed and such sugar goes into solution with the remaining liquid portion, thereby rendering it sweeter.

Nitrous oxide gas provides the pressure in the blender and storage device 13 and transfers that pressure hydrostatically to the chamber 43. Some such gas dissolves in the liquid in the blending and storage device 13, and the dissolved gas leaves the portion of the liquid being frozen in the chamber 43 to become absorbed by the remaining liquid portion which can now take on additional gas since it has a lower temperature than the blending and storage device 13. The solution of the nitrous oxide gas with the liquid portion in the chamber 43 is highly unstable and so that upon discharge to atmospheric pressure, as aided by an agitating type of dispensing, the gas immediately breaks out of the product, thereby fluffing it up or whipping it to make the semifrozen comestible light and fluffy.

It is considered preferable to employ the two refrigeration systems 37 and 51. One reason for this is that there is a substantial difference in the amount of refrigration capacity needed. By way of example, the refrigeration system 51 for one cylinder 43 and one precool plate 24 typically has a 2-horsepower capacity while the refrigeration system 37 typically has only 4 of 5 percent of that capacity. By using a small refrigeration system 37, the likelihood of freezing that portion of the line 25 that is in the chamber 36 is minimized.

By use of the metering pump 32, it is possible to accurately control the flow of a rather heavy syrup, and the source 15 of such concentrate does not need pressurization for dispensing, thereby facilitating the addition of concentrate thereto without interfering with any of the pressurized portions of the system.

There is considerable turbulence in the blending and storage device 13 when it is being refilled, whereby the liquid takes on a maximum amount of the nitrous oxide gas. During any subsequent static period, as when little or no dispensing is taking place, the tendency for the mixture to take on additional gas, if any, continually decreases, and thus overnight storages does not provide a problem. By use of the refrigeration system 37, the unfrozen concentrate in the source 15 and the reconstituted mixture in the blending and storage device 13 have excellent keeping qualities. Citrus pulp does not accumulate anywhere in this system and therefore the cleaning interval does not need to be as often as daily.

Although various minor modifications might be made or suggested by those versed in the art, it should be understood that I wish to employ within the scope of the patent warranted hereon, all such embodiments as reasonably and properly come within the scope of my contribution to the art.

I claim as my invention:

1. Apparatus for dispensing semifrozen comestible, comprising:
   a. a storage source of a comestible of admixed ingredients arranged to be directly pressurized with a food-grade gas;
   b. a first refrigeration system for acting on said storage source to maintain the temperature of the comestible therein a few degrees above freezing, and responsive to the temperature at said source;
   c. a freezing cylinder having a chamber for partially freezing the comestible, and connected to said storage source for receiving unfrozen comestible therefrom in response to the pressure therein;
   d. a second refrigeration system independent of said first refrigeration system for acting on said freezing cylinder and responsive to the consistency of the product therein; and
   e. a dispensing valve connected to said cylinder.

2. Apparatus according to claim 1, in which said storage source comprises:
   a. a blending and storage device;
   b. a source of concentrated comestible at atmospheric pressure;
   c. a source of water connected to said blending and storage device and arranged to deliver water under pressure thereto; and
   d. a proportioning and pressurizing pump connecting said source of concentrated comestible to said blending and storage device.

3. Apparatus for dispensing a semifrozen comestible, comprising:
   a. a blending and storage device arranged to be pressurized with a food-grade gas;
   b. a source of concentrated comestible at atmospheric pressure;
   c. a proportioning and pressurizing pump connecting said source of concentrated comestible to said blending and storage device;
   d. a refrigerated precool plate;
   e. a source of water connected via said precool plate to said blending and storage device and arranged to deliver water under pressure thereto;
   f. a freezing cylinder having a chamber for partially freezing the comestible, and connected to said blending and storage device for receiving unfrozen comestible therefrom in response to the pressure therein; and
   g. a dispensing valve connected to said cylinder.

4. Apparatus according to claim 3, wherein a refrigeration system acts on said source of concentrated comestible to maintain it just above freezing.

5. Apparatus according to claim 4 wherein said refrigeration system acts also on said blending and storage device to maintain it just above freezing.

6. Apparatus according to claim 3, wherein a refrigeration system acts on said blending and storage device to maintain it just above freezing.

* * * * *